US008878927B2

(12) United States Patent
Richardson et al.

(10) Patent No.: US 8,878,927 B2
(45) Date of Patent: Nov. 4, 2014

(54) METHOD AND APPARATUS FOR GENERATING INFRASTRUCTURE-BASED BASIC SAFETY MESSAGE DATA

(75) Inventors: James Joseph Richardson, Temecula, CA (US); Douglas M. Kavner, Orange, CA (US)

(73) Assignee: Raytheon Company, Waltham, MA (US)

(*) Notice: Subject to any disclaimer, the term of this patent is extended or adjusted under 35 U.S.C. 154(b) by 870 days.

(21) Appl. No.: 12/981,810

(22) Filed: Dec. 30, 2010

(65) Prior Publication Data

US 2012/0105625 A1 May 3, 2012

Related U.S. Application Data

(60) Provisional application No. 61/407,576, filed on Oct. 28, 2010.

(51) Int. Cl.
*H04N 7/18* (2006.01)
*G08G 1/16* (2006.01)
*G01B 11/02* (2006.01)
*B60R 1/00* (2006.01)
*G08G 1/04* (2006.01)

(52) U.S. Cl.
CPC .............. *G08G 1/164* (2013.01); *G01B 11/022* (2013.01); *B60R 1/00* (2013.01); *H04W 7/181* (2013.01); *G08G 1/04* (2013.01)
USPC ........... 348/135; 348/141; 348/143; 348/148; 348/149

(58) Field of Classification Search
CPC ........ G01B 11/022; H04N 7/181; B60R 1/00; G08G 1/04
USPC .......................... 348/135, 141, 143, 148, 149
See application file for complete search history.

(56) References Cited

U.S. PATENT DOCUMENTS

| | | | |
|---|---|---|---|
| 5,983,161 A | 11/1999 | Lemelson et al. | |
| 6,472,978 B1 | 10/2002 | Takagi et al. | |
| 8,521,412 B2 * | 8/2013 | Miucic | 701/300 |
| 2005/0107954 A1 | 5/2005 | Nahla | |

(Continued)

FOREIGN PATENT DOCUMENTS

| | | |
|---|---|---|
| DE | 19618922 A1 | 11/1996 |
| DE | 102006057741 A1 | 9/2007 |
| DE | 102008006950 A1 | 8/2008 |

OTHER PUBLICATIONS

Ess, A. et al., "Moving Obstacle Detection in Highly Dynamic Scenes", Robotics and Automation, May 12, 2009, pp. 56-63.

(Continued)

*Primary Examiner* — Shawn An
(74) *Attorney, Agent, or Firm* — Lando & Anastasi, LLP

(57) ABSTRACT

A roadside infrastructure system configured to generate and broadcast basic safety message data to augment vehicle safety applications. In one example, a roadside module of the system includes a camera, video analytics to process images from the camera to detect vehicles, a BSM generator that generates a BSM for each detected vehicle, and an antenna for broadcasting the BSM. In another example, the roadside module is configured to detect BSM data generated by equipped vehicles, to determine whether any detected vehicles are equipped vehicles generating their own BSM data, and to generate a BSM only for unequipped detected vehicles.

17 Claims, 10 Drawing Sheets

(56) References Cited

U.S. PATENT DOCUMENTS

| | | | |
|---|---|---|---|
| 2008/0015772 A1 | | 1/2008 | Sanma et al. |
| 2008/0055056 A1* | | 3/2008 | Mase et al. .................. 340/425.5 |
| 2010/0100324 A1 | | 4/2010 | Caminiti et al. |
| 2010/0100325 A1 | | 4/2010 | Lovell et al. |
| 2010/0305858 A1* | | 12/2010 | Richardson ................... 701/301 |

OTHER PUBLICATIONS

Ess, A. et al., "Improved Multi-Person Tracking with Active Occlusion Handling", ICRA Workshop on People Detection and Tracking with Active Occlusion Handling, http://srl.informatik.uni-freiburg.de/cpnferences/icra09ws/papers/07T-Ess.pdf retrieved Aug. 2010.

Linzmeier D., et al., "Pedestrian Detection with Thermopiles Using an Occupancy Grid", Intelligent Transportation Systems, Oct. 3, 2004, pp. 1063-1068.

Tay, C. et al., "The Bayesian Occupation Filter" Probabilistic Reasoning and Decision Making in Sensory-Motor Systems Springer, Jul. 11, 2008, http://hal.inria.fr/inria-00295084/fr/ retrieved Aug. 2010.

Chen, C. et al., Dynamic Environment Modeling with Gridmap: A Multiple Object Tracking Application Control, Automation, Robotics and Vision, Dec. 1, 2006, pp. 1-6.

Ghandi, Tarak, et al., "Image Based Estimation of Pedestrian Orientation for Improving Path Prediction", Intelligent Vehicles Symposium, Jun. 4, 2008, pp. 506-511.

Banias O. et al., "Problem Setting and Modeling in Vehicles and Pedestrians Traffic Control Using Sensor Networks", Applied Computational Intelligence and Informatics, May 1, 2007, pp. 83-88.

Nimmagadda, "Building an Autonomous Ground Traffic System", May 20, 2007, http://www.cs.utexas.edu/ftp/pub/techreports/hr09-09.pdf.

Schroder et al., "Path Planning for Cognitive Vehicles Using Risk Maps", Intelligent Vehicles Symposium Jun. 4, 2008, pp. 1119-1124.

Gindele, T. et al., "Bayesian Occupancy Grid Filter for Dynamic Environments Using Prior Map Knowledge", Intelligent Vehicles Symposium, Jun. 3, 2009, pp. 669-676.

* cited by examiner

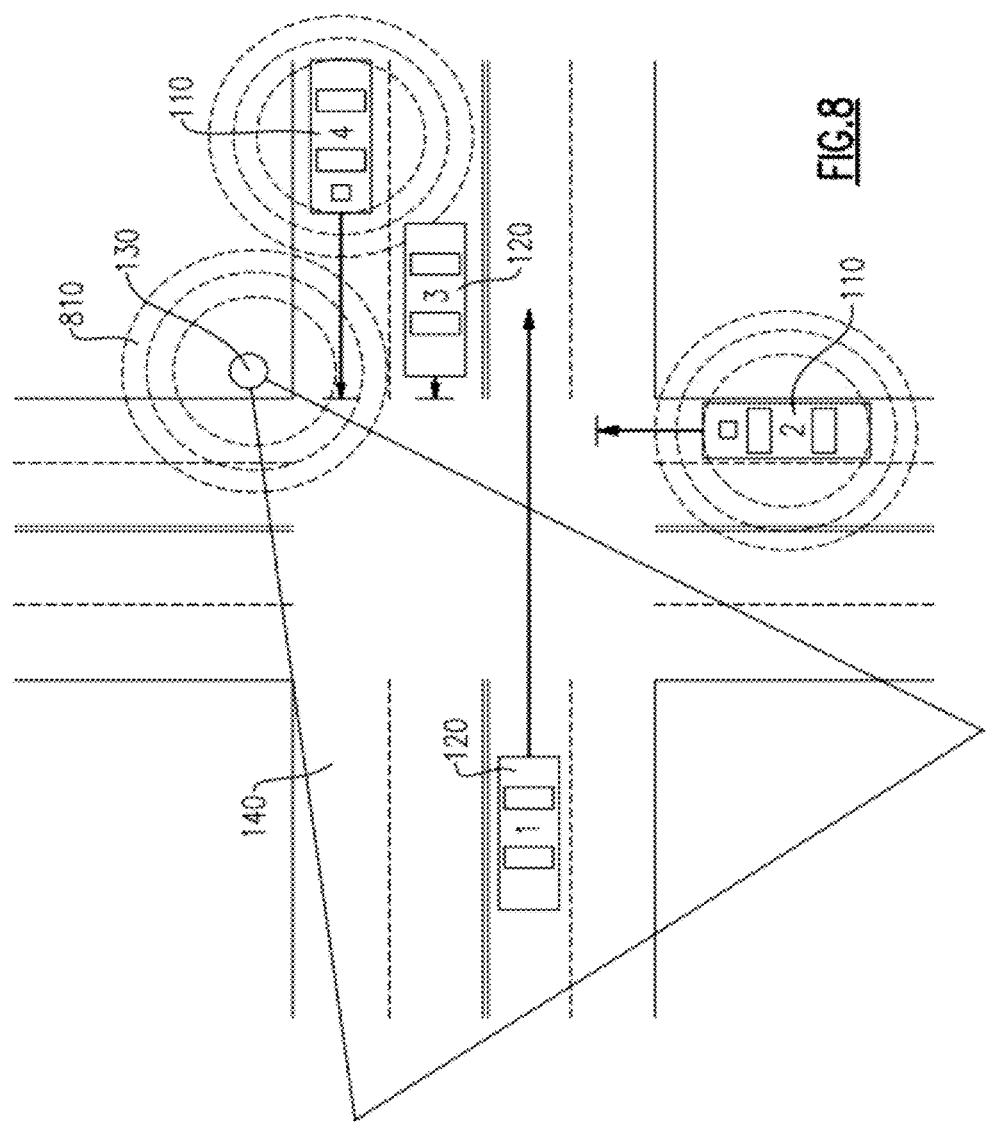

METHOD AND APPARATUS FOR GENERATING INFRASTRUCTURE-BASED BASIC SAFETY MESSAGE DATA

CROSS REFERENCE TO RELATED APPLICATIONS

This application claims the benefit under 35 U.S.C. §119(e) of U.S. Provisional Application No. 61/407,576 entitled "METHOD AND APPARATUS FOR GENERATING INFRASTRUCTURE-BASED BASIC SAFETY MESSAGE DATA" filed on Oct. 28, 2010, which is herein incorporated by reference in its entirety.

BACKGROUND

There are several systems for vehicle safety that use the SAE J2735 message specification "basic safety message" (BSM) for vehicle-to-vehicle safety applications such as, for example, cooperative intersection collision avoidance system (CICAS) applications. These systems are also commonly referred to as vehicle infrastructure integration (VII) safety systems, such as the safety and connectivity applications currently sponsored by the U.S. Department of Transportation. In these systems, equipped vehicles transmit and receive BSM data between one another, and can use this data to avoid collisions with one another. However, the deployment of CICAS and other data-driven vehicular safety applications is limited in effectiveness proportional to the relative numbers of equipped versus unequipped vehicles. Unequipped vehicles still pose the same collision threat to both equipped and unequipped vehicles. Until the "penetration" of the deployment reaches a certain level, it is unlikely that the safety applications will realize an appreciable positive benefit or an overall reduction in collisions.

SUMMARY OF INVENTION

Aspects and embodiments are directed to systems and methods for generating basic safety message (BSM) data from stand-off sensors that are part of a roadside infrastructure and broadcasting this BSM data to augment vehicle safety applications.

According to one embodiment, a roadside infrastructure system for generating basic safety message (BMS) data includes a roadside module comprising a camera configured to provide an image of a predetermined fixed area, video analytics coupled to the camera and configured to process the image to detect objects within the image, the video analytics being further configured to output a position of a detected object, a BSM generator coupled to the video analytics and configured to receive the position of the detected object and to generate a BSM comprising the position of the object, and an antenna coupled to the BSM generator and configured to receive the BSM from the BSM generator and to broadcast the BSM. The detected object may be a vehicle, for example.

In one example of the system, the video analytics is configured to output the position of the detected object as a latitude and longitude of the detected object. The video analytics may be further configured to register the image to a known latitude and longitude grid based on a known location or registration of the camera to determine the latitude and longitude of the detected object. In another example, the video analytics is further configured to output an image-based position of the detected object, and the system further comprises a processor coupled to the video analytics and to the BSM generator, and configured to receive the image-based position of the detected object and to determine an object-center position of the detected object, wherein the BSM generator is configured to generate the BSM comprising the object-center position of the detected object. The system may further comprise a processor coupled to the antenna and to the BSM generator, wherein the antenna is further configured to receive BSM data from BSM-generating objects, and wherein the processor is configured to determine whether the detected object corresponds to a BSM-generating object, and to control the BSM generator to generate the BSM only for non-BSM-generating detected objects. In another example the system further comprises a sensor coupled to the video analytics. The sensor may be, for example, an infrared sensor, a radar, a sonar, a thermal imaging sensor, or a combination of these. In another example, the BSM comprises an indicator identifying the BSM as having been generated by the roadside module.

According to another embodiment, a method of generating basic safety message (BSM) data from stand-off sensors comprises obtaining an image of a predetermined fixed area, processing the image to detect an object within the image, determining a position of the detected object, generating a BSM comprising the position of the detected object, and broadcasting the BSM.

In one example of the method, the step of determining the position of the detected object includes determining an image-based position of the detected object, and converting the image-based position to an object-center position of the detected object. In one example, the image-based position corresponds to a lower center position on a bounding box surrounding the detected object in the image. In this example, converting the image-based position to the object-center position includes determining a three-dimensional object box corresponding to the detected object in the image, performing geometric calculations to determine a calculated length, height and depth of the three-dimensional object box, comparing the length, height and depth to known ratios of length to height to depth corresponding to common objects to confirm that the calculated length, height and depth of the three-dimensional object box are within predetermined tolerances, and determining the object-center position from the image-based position. In another example, determining the object-center position of the detected object includes determining a latitude and longitude of the detected object.

The method may further comprise steps of receiving vehicle-generated BSM data, and determining whether the vehicle-generated BSM data originates from the detected object. In one example, generating the BSM includes generating the BSM only if the vehicle-generated BSM data does not originate from the detected object. In another example, the method further comprises detecting multiple objects, resolving which detected objects are generating the vehicle-generated BSM data, and generating the BSM only for those detected objects which are not generating the vehicle-generated BSM data. In another example, broadcasting the BSM includes broadcasting the BSM using a dedicated short range communication standard. In a further example, determining the position of the detected object includes registering the image to a known latitude and longitude grid to determine a latitude and longitude of the detected object. Obtaining the image may include obtaining the image using at least one of a camera, radar, sonar, and a thermal imaging sensor, for example.

According to another embodiment, a method of generating infrastructure-based basic safety message (BSM) data comprises obtaining at a roadside module at least one image of a predetermined fixed area corresponding to a zone of coverage of the roadside module, processing the at least one image to detect a plurality of detected vehicles and to obtain an image-based position of each detected vehicle, using a depth-dimensioning process to determine a vehicle-center latitude and longitude for each detected vehicle based on the image-based position of each detected vehicle, receiving at the roadside module vehicle-generated BSM data, resolving which of the plurality of detected vehicles are generating the vehicle-generated BSM data, generating a BSM for each detected vehicle which is not generating the vehicle-generated BSM data, and broadcasting the BSM from the roadside module.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIG. 8 is a schematic block diagram of an intersection monitored by roadside infrastructure according to aspects of the invention.

DETAILED DESCRIPTION

Figure 1:
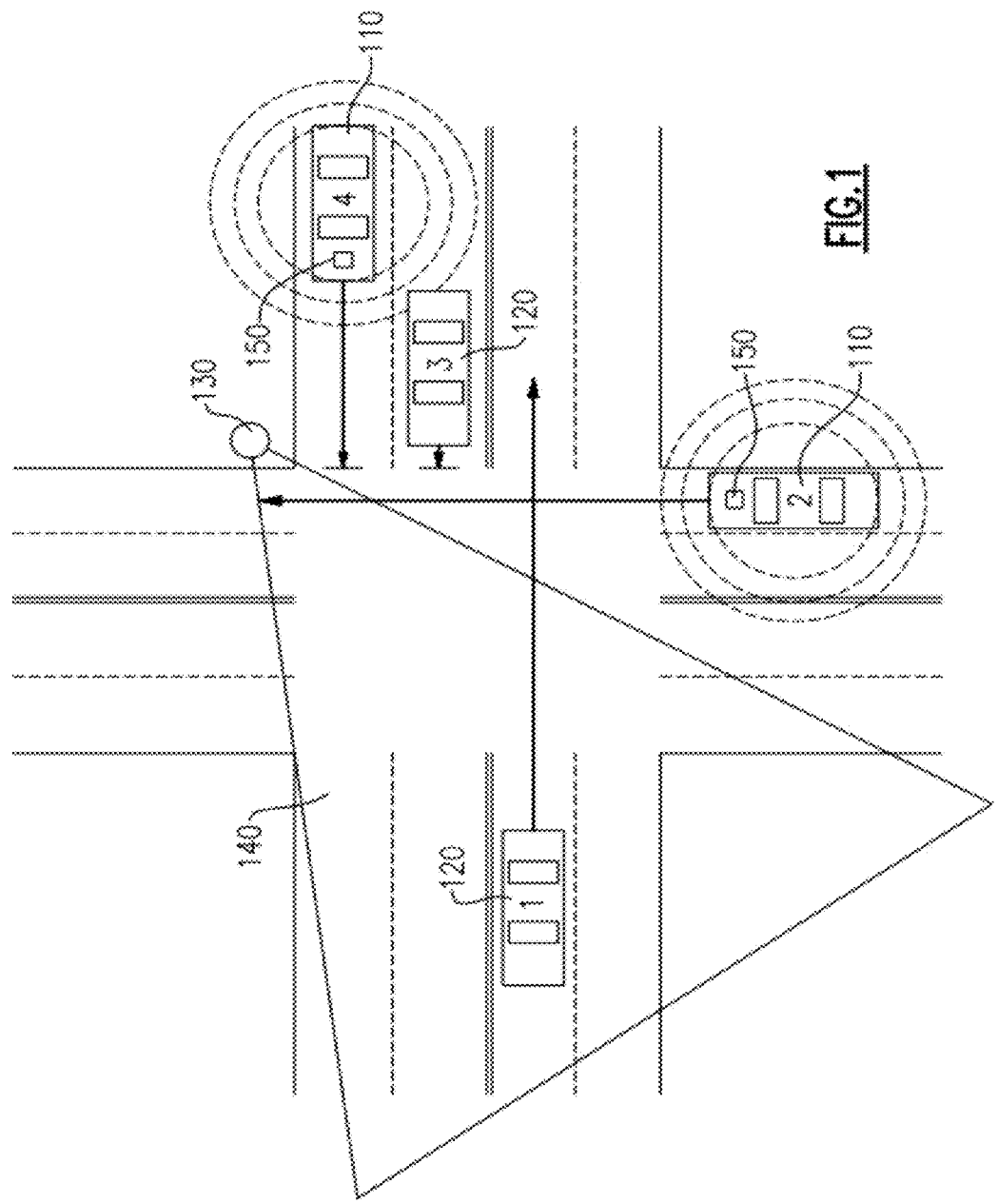
FIG. 1 is a schematic block diagram of an intersection monitored by roadside infrastructure according to aspects of the invention.

Aspects and embodiments are directed to a system and method for generating periodic basic safety message (BSM) data, also referred to as a "Here I am" message, for vehicles and/or other objects that are not actively generating the BSM data themselves, thereby increasing the effectiveness of BSM safety applications. As discussed in more detail below, the system uses a stand-off (i.e., not vehicle-based) sensor system to detect vehicles and/or objects at a given installation location. By identifying unequipped vehicles/objects among the detected vehicles/objects and generating the BSM for them, the system enables equipped vehicles to realize a greater benefit and reduced vehicle-vehicle collision threats compared to a system deployment relying on vehicle-generated messages only.

According to one embodiment, the system includes roadside infrastructure configured to monitor predetermined areas, for example, those areas where the risk of collision may be high, such as intersections, to detect vehicles within the areas, and to generate and broadcast the BSM for the detected, unequipped vehicles. The system may also include on-board equipment on equipped vehicles that is configured to receive the BSM, calculate information related to a risk of collision, and to take action, for example, to warn the driver of the equipped vehicle, as discussed in more detail below. The on-board equipment is also configured to generate and broadcast the BSM for the equipped vehicle. In one embodiment, the roadside infrastructure is further configured to receive BSM data from equipped vehicles and to resolve which, if any, received BSM data originates from detected vehicles, so as to avoid broadcasting duplicate BSM data, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1 there is illustrated a schematic diagram of a system deployed at an intersection. Illustrated at the intersection are two equipped vehicles 110, each capable of generating and receiving BSM data, and two unequipped vehicles 120. The system's roadside infrastructure includes a roadside module 130 configured to detect vehicles and/or other objects within a predetermined area 140, also referred to as the module's zone of coverage. Each of the equipped vehicles 110 includes on-board equipment 150 configured to detect information which can be used to predict the path of the equipped vehicle. For example, the on-board equipment 150 may include various sensors, such as a camera, global positioning system (GPS) unit, velocity sensor, acceleration sensor, and/or angular orientation sensor. Each equipped vehicle 110 processes data collected from the on-board equipment sensors to generate a BSM for itself. The BSM generated by the equipped vehicle 110 is referred to herein as an "organic BSM." The on-board equipment also includes an antenna configured to broadcast the BSM and to receive BSM data from other sources. The BSM may include, for example a position of the vehicle, expressed in terms of latitude and longitude, as well as other information, such as the velocity and/or acceleration/deceleration of the vehicle. The on-board equipment 150 may optionally include a path predicting circuit that uses information gathered from the on-board equipment sensors to predict a path of the equipped vehicle 110. The path predicting circuit may also use the information provided in the BSM data received from other equipped vehicles 110 to predict the paths of those vehicles. The on-board equipment may be configured to warn the driver of the equipped vehicle if the predicted path of a detected vehicle would result in a collision with the equipped vehicle. Thus, using the on-board equipment, equipped vehicles can take action, and/or alert their drivers to take action, to avoid collisions. By detecting and generating BSM data for unequipped vehicles or objects, the roadside infrastructure increases the data available to equipped vehicles enabling the equipped vehicles to further reduce vehicle-vehicle collision threats.

Figure 2:
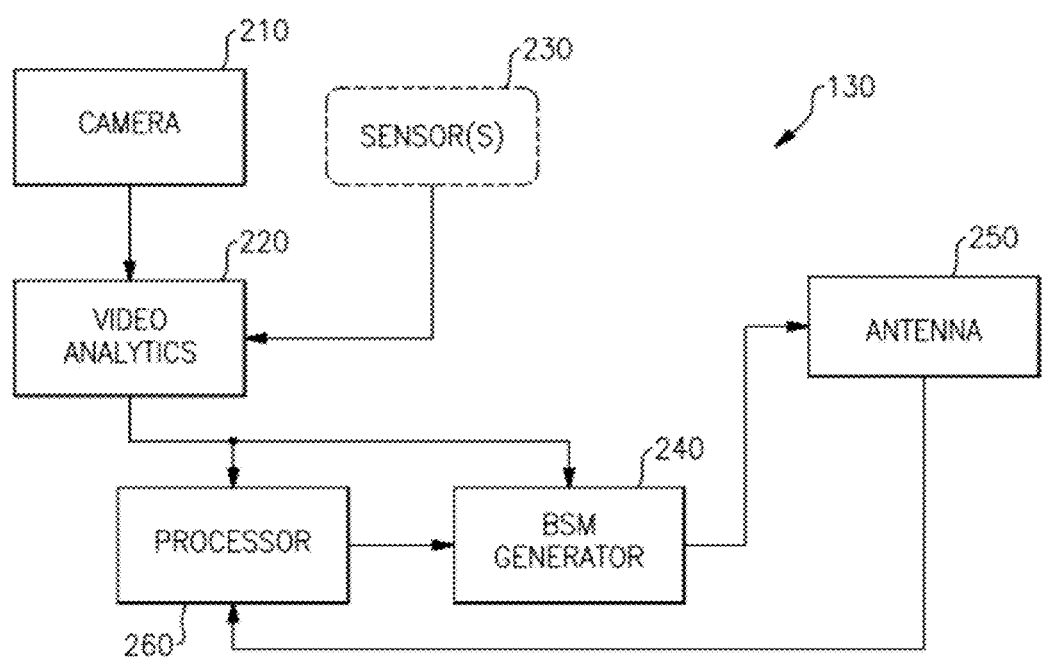
FIG. 2 is a functional block diagram of one example of a roadside module according to aspects of the invention.

The roadside module 130 gathers object information about objects within the zone of coverage 140, such as location, and encodes this information into a BSM that is broadcast. Referring to FIG. 2, according to one embodiment, the roadside module 130 includes one or more cameras 210 configured to provide an image of the zone of coverage 140, and video analytics 220 coupled to the camera and configured to detect an object in the image using pixel image decoding or other camera object detecting technology, as would be understood by those skilled in the art, given the benefit of this disclosure. The camera 210 may also operate in concert with another sensor 230, such as an infrared sensor, radar, sonar or a thermal imaging sensor to improve object detection under all lighting and/or weather conditions. In one example, the video analytics 220 includes embedded model-based tracking algorithms to ensure objects are not dropped due to momentary line-of-sight obstruction between the camera and the object. In one example, the roadside module 130 uses camera 210 and video analytics 220 systems that are available current art in the security camera system field. The roadside module 130 also includes a BSM generator 240 that generates a BSM including the location of the detected object, and an antenna 250 for broadcasting the BSM, as discussed in more detail below. In one embodiment, the antenna 250 is also configured to receive organic BSM data which is processed by a processor 260 to resolve which organic BSM data, if any, originates from a sensor-detected vehicle and thus avoid broadcasting duplicate BSM data. It is to be appreciated that although FIG. 2 illustrates the video analytics 220, BSM generator 240 and processor 260 as separate functional elements, some or all of these elements may be implemented together and/or the functions may be shared across elements. Accordingly, the video analytics 220, BSM generator 240 and processor 260 are not required to be separate components.

According to one embodiment, the video analytics 220 of the roadside module 130 are configured to provide the location of the detected object, specified as a latitude and longitude of the object. In order to determine the latitude and longitude of a detected object, a registration process may be used to align and correlate the sensor field(s) of view to the Earth-fixed latitude/longitude grid. The registration process may also perform a geometric solution to determine the latitude and longitude of the camera, or roadside module 130, and the calculated coordinates can be compared against a known deployment location of the roadside module 130 to assess or confirm the accuracy of the registration process.

Figure 3:
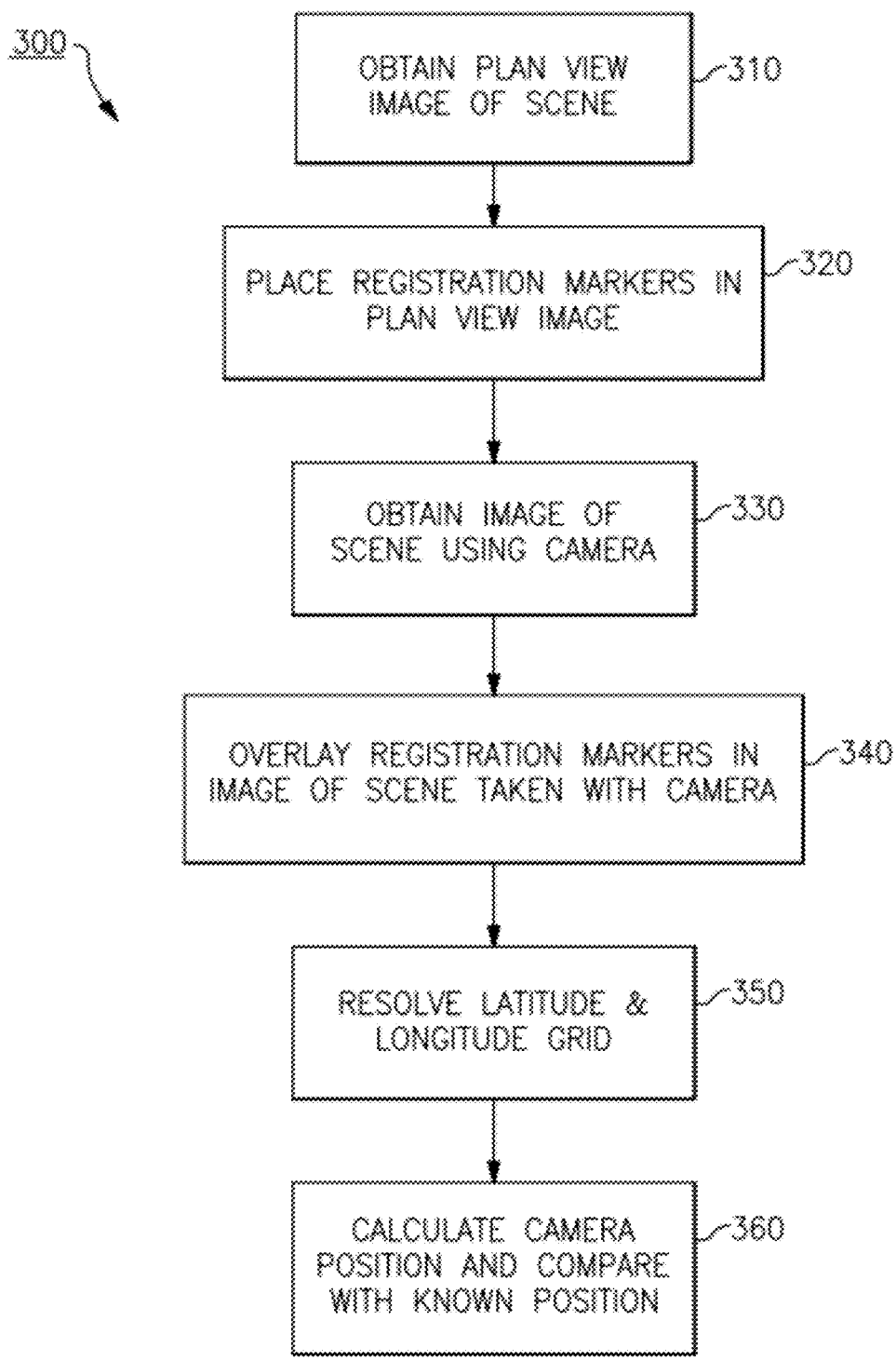
FIG. 3 is a flow diagram illustrating one example of a registration process according to aspects of the invention.

FIG. 3 illustrates a flow diagram of one example of a registration process 300. Step 310 includes obtaining a plan view image (i.e., taken from directly overhead) of a scene within the zone of coverage 140 of the camera 210. Registration markers, such as three or four lines forming a box, are placed over the plan view image using obvious, visible landmarks as guidance for their placement (step 320). An image of the same scene is taken using the camera 210 of the roadside module 130 (step 230). The camera 210 is generally placed above the scene, with a field of view pointing down at an angle, thereby creating a roughly triangular-shaped zone of coverage 140 as illustrated schematically in FIG. 1. Accordingly, when the camera 210 takes an image of the scene, and the registration markers are overlaid on the camera image using the same obvious, visible landmarks as guidance for their placement (step 340), the registration markers are skewed due to the angle of the camera 210. For example, if the registration markers include four straight lines forming a square or rectangle over the scene in the plan view, in the camera view, the square or rectangle will be distorted. The video analytics 220 may be programmed to use the difference between the registration markers in the plan view image and in the camera image to effectively create a latitude and longitude grid over the scene (step 250) and register the camera. The video analytics resolves the camera view image pixel locations to latitude and longitude grid locations based on this registration process. From the latitude and longitude grid, the video analytics may output the calculated latitude and longitude of the camera 210, which can be compared to the known deployment location of the roadside module 130 (step 360) to verify the accuracy of the registration process and thus of the latitude and longitude coordinates calculated by the video analytics 220.

As discussed above, according to one embodiment, the camera 210 of the roadside module 130 obtains an image of the scene within its zone of coverage 140, and the video analytics 220 processes the image, optionally together with data received from another sensor 230, to detect any vehicles in the image. The video analytics 220 then registers the image to the known latitude and longitude grid determined above, to obtain the latitude and longitude of the detected vehicle. In one embodiment, this process includes drawing a bounding box around the detected vehicle image and registering the box using the same procedure described above (step 350) for the initial registration of the roadside module 130, to determine the image-based position (latitude and longitude) of the detected vehicle.

In one embodiment, the location on the vehicle of the image-based position calculated for the detected vehicle does not correspond to the center of the vehicle. For example, the image-based position location may be at the bottom center of the box surrounding the detected vehicle in the image taken by the camera. However, the J2735 BSM specification requires that the position location of the vehicle coincide with the center of the vehicle. Accordingly, in one embodiment, the system includes a processing device 260 (which may be separate functional element or part of the video analytics 220 or BSM generator 240) configured to implement a depth dimensioning process to translate the reported image-based vehicle position locations to vehicle-center position locations, in accord with the J2735 BSM specification.

Figure 4:
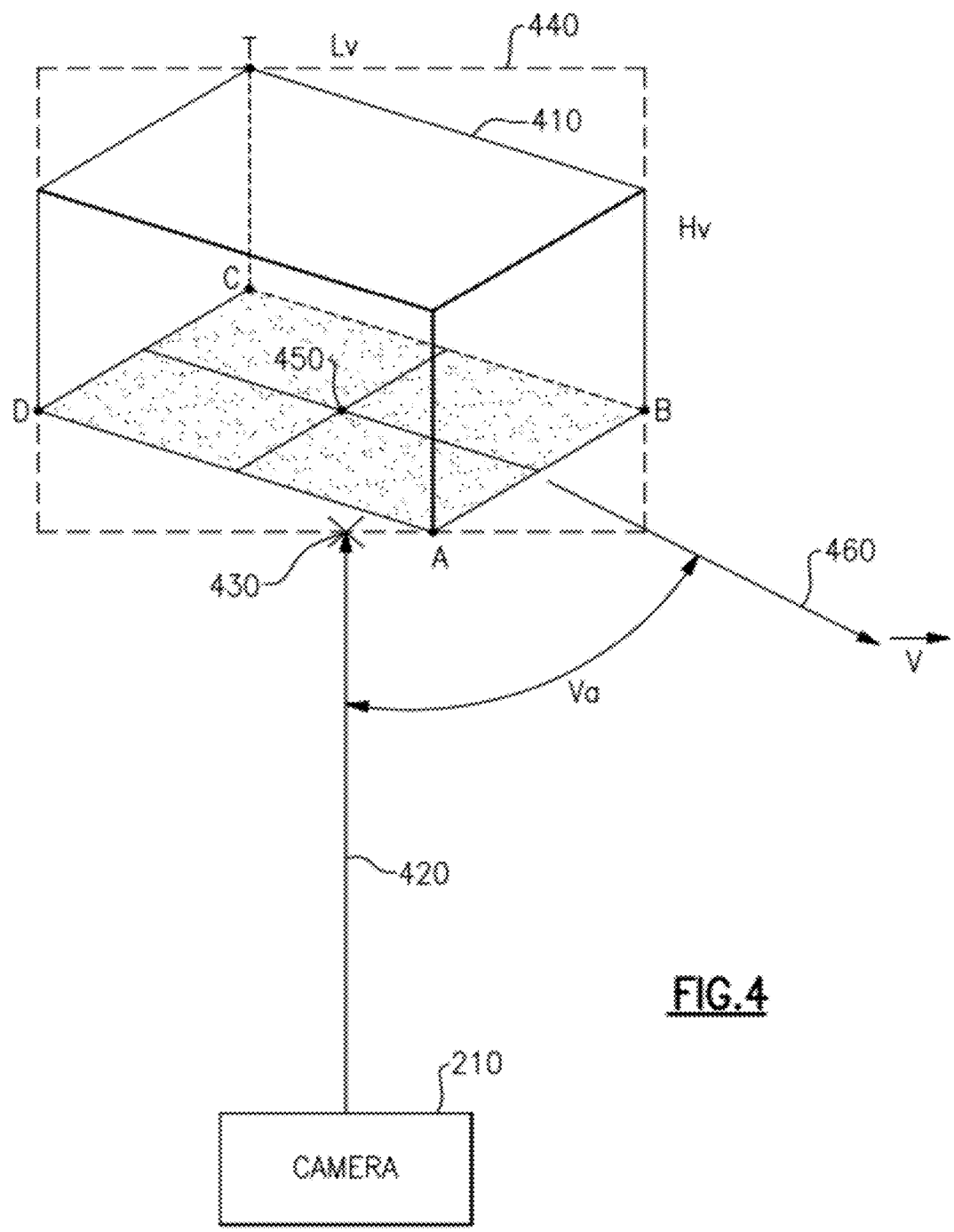
FIG. 4 is a schematic diagram illustrating one example of a depth dimensioning process according to aspects of the invention.

Referring to FIG. 4, there is illustrated a schematic diagram to illustrate an example of a depth dimensioning process according to one embodiment, In FIG. 4, a three-dimensional rectangle box 410 represents a detected vehicle (or other large object). The camera 210 has a line of sight to the object represented by arrow 420. In one example, the system video analytics 220 discussed above outputs the image-based position (latitude and longitude) of the bottom center position 430 on a two-dimensional bounding box 440 drawn around the detected object in the image taken by the camera 210. However, as discussed above, the desired latitude and longitude is at the center 450 of the rectangular projection of the three-dimensional object box 410 onto the ground plane (shaded area). In the nominal example, this projection is a parallelogram as viewed from the camera 210. The camera 210 has a viewing azimuth Va and a viewing elevation Ve relative to the heading (represented by arrow 460) of the object. The three-dimensional object box 410 has dimensions Lo (length), Do (depth) and Ho (height). The two-dimensional bounding box in the camera image has viewed dimensions Lv (length) and Hv (height).

Figure 5:
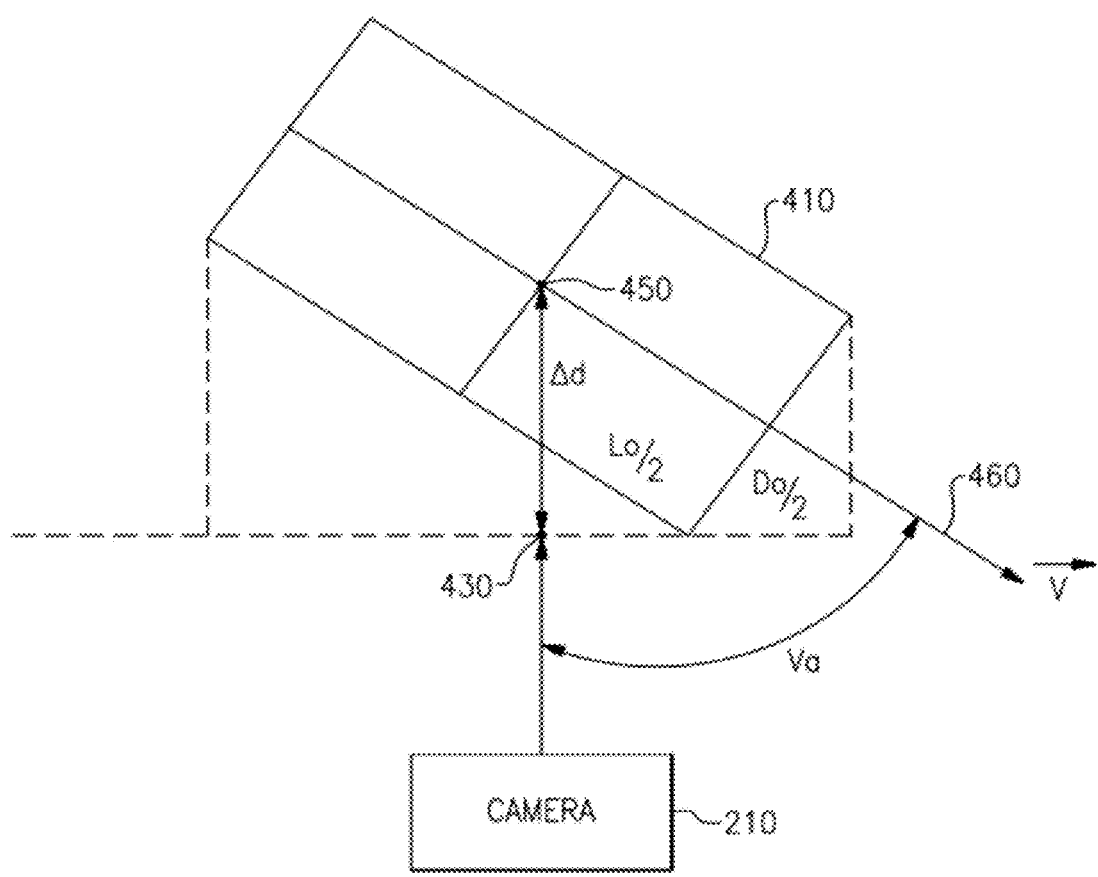
FIG. 5 is a plan view diagram corresponding to the diagram of FIG. 4.

Due to assumed diagonal symmetry, the vehicle-center position location 450 is along the same camera line of sight 420 as the bounding box bottom center 430. Accordingly, referring to FIG. 5 which is a plan view of FIG. 4, the additional distance Δd from the image-based position 430 to the vehicle-center position location 450 is given by the following equation:

$$\Delta d = \frac{Lo}{2}|\cos(Va)| + \frac{Do}{2}|\sin(Va)| \quad (1)$$

For the general case illustrated in FIG. 4, the bounding box 440 viewed dimensions of length (Lv) and height (Hv) are given by the following equations:

$$Lv = Do|\cos(Va)| + Lo|\sin(Va)| \quad (2)$$

$$Hv = Ho|\cos(Ve)| + Do|\cos(Va)||\sin(Ve)| + Lo|\sin(Va)||\sin(Ve)| \quad (3)$$

For vehicles, the ratios of Ho:Lo:Do are given based on known most common vehicle sizes. A list of most common ratios, in order of most common to least common, may be programmed into the processing device as configuration data. Given the bounding box dimensions Lv and Hv as reported by the video analytics 220 and ratios of Ho:Lo:Do given as configuration data, the processing device 260 may solve the depth dimensioning equations (2) and (3) above to determine the vehicle or other large object dimensions Ho, Lo and Do.

Figure 6:
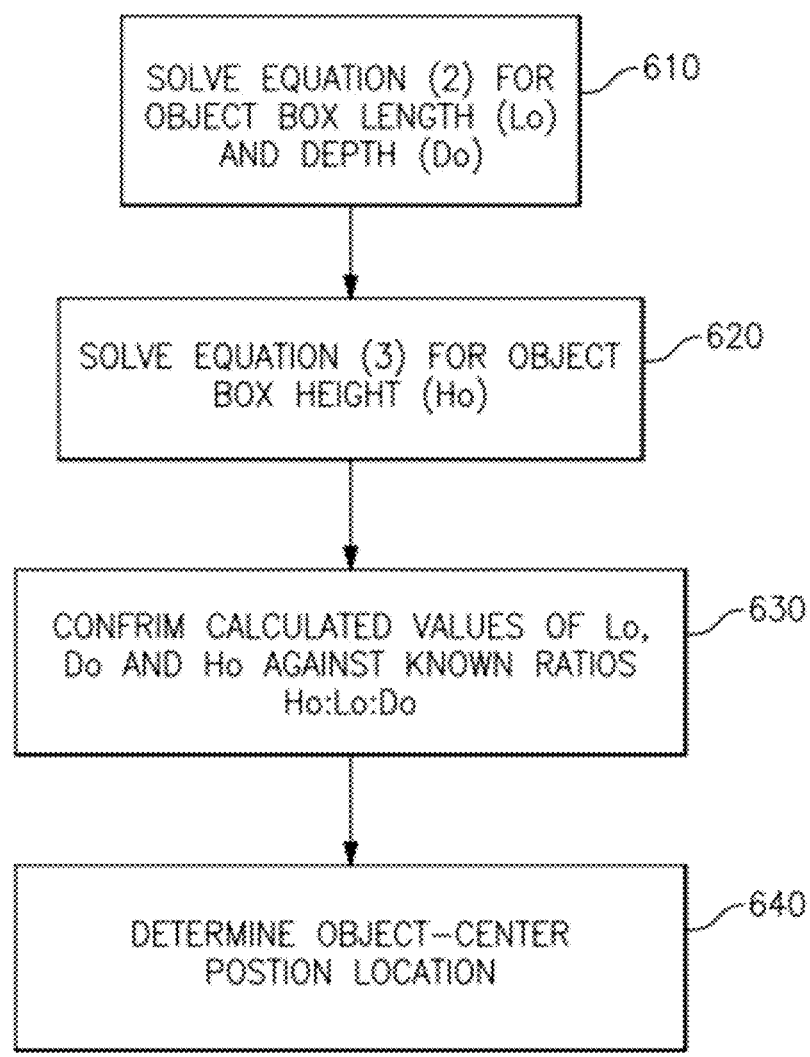
FIG. 6 is a flow diagram illustrating one example of a depth dimensioning process according to aspects of the invention.

Referring to FIG. 6 there is illustrated a flow diagram of one example of a depth dimensioning process 600 according to one embodiment. In a first step 610, equation (2) is solved for Lo and Do. The camera viewing azimuth Va is assumed to be known based on the computed heading of the vehicle's motion relative to the known camera line of sight as may be reported by the video analytics, or may be calculated from the known camera placement location to the reported vehicle location using existing range/bearing to point routines. In step 620, Equation (3) is solved for Ho using the values of Lo and Do obtained from solving Equation (2) in step 610. The solved values of Lo, Ho and Do may then be checked against the known ratios to confirm that the values are within a predetermined tolerance (step 630). If the values are out of tolerance, the system may check against the next most-common ratio set and/or adjust the ratios within prescribed limits to bring the ratios to within the predetermined tolerance. This step (630) may be repeated until acceptable values of Do, Lo and Ho are determined. Once acceptable values of Do, Lo and Ho have been computed, the vehicle-center position location 450 (latitude and longitude) can be determined in step 640 based on the image-based bounding box bottom center position 430 using Equation (1).

Figure 7A:
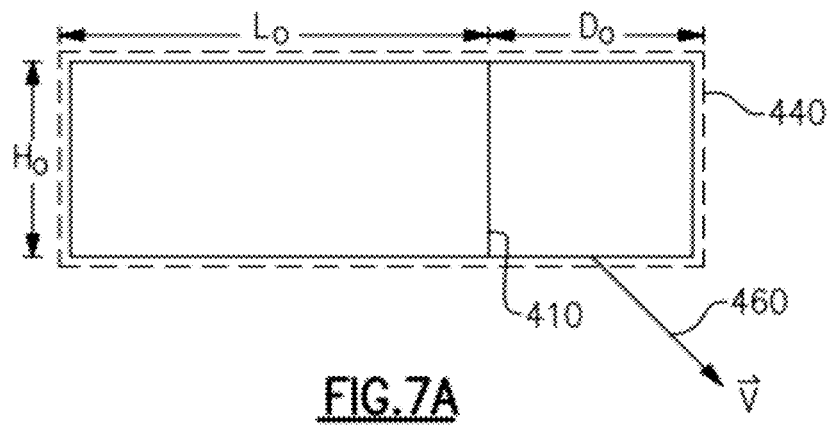
FIG. 7A is a schematic diagram corresponding to one example of a special case of the depth dimensioning process of FIG. 4.
Figure 7B:
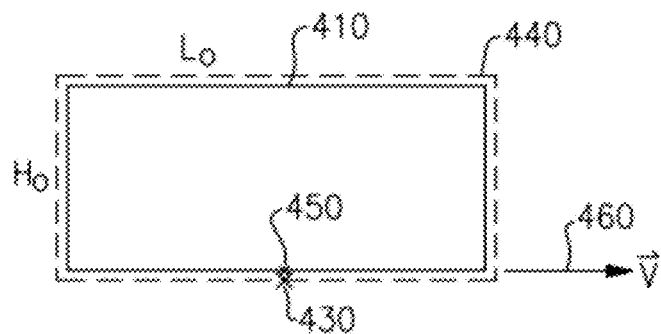
FIG. 7B is a schematic diagram corresponding to another example of a special case of the depth dimensioning process of FIG. 4.

The above-discussed depth dimensioning process 600 may be used to determine the vehicle-center position location 450 for the general case. The following examples illustrate simplifications for the process for certain special cases and validate the process for these special cases. For example, referring to FIG. 7A there is illustrated a schematic diagram corresponding to a first special case in which the "top" of the vehicle is not visible in the image (i.e., the viewing elevation angle is zero degrees). In this example, Equation (3) is reduced to trivial form because cos(0)=1 and sin(0)=0, and the height Ho of the object box 410 is the same as the height Hv of the bounding box 440. This example can be further simplified for the special case in which no "top" and no "front" of the vehicle are visible (i.e., a "side only" view in which the viewing elevation angle is zero degrees and the viewing azimuth angle is ±90 degrees), illustrated in FIG. 7B. In this example, both Equations (2) and (3) are reduced to trivial form because cos(90)=0 and sin(90)=1, and the height Ho and length Lo of the object box 410 are equal to the height Hv and length Lv of the bounding box 440, respectively, as shown in FIG. 7B.

Figure 7C:
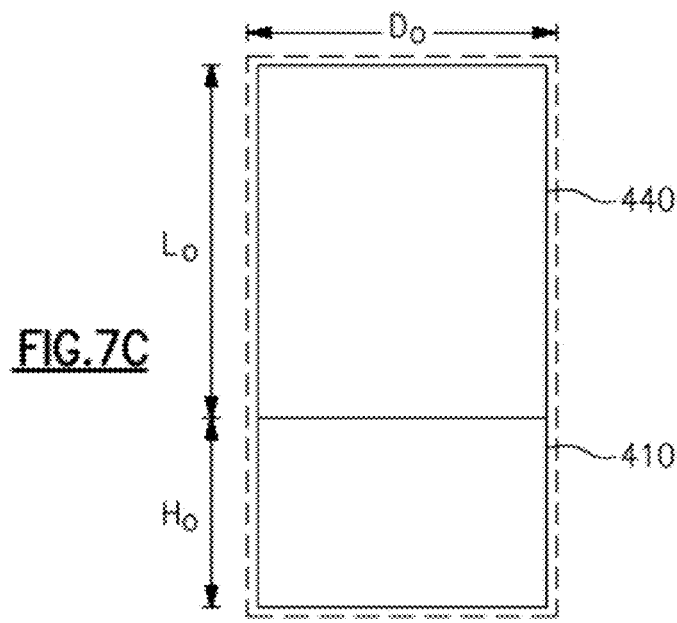
FIG. 7C is a schematic diagram corresponding to another example of a special case of the depth dimensioning process of FIG. 4.
Figure 7D:
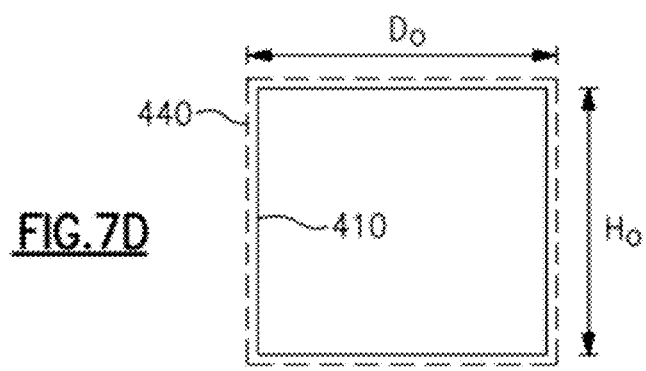
FIG. 7D is a schematic diagram corresponding to another example of a special case of the depth dimensioning process of FIG. 4.
Figure 7E:
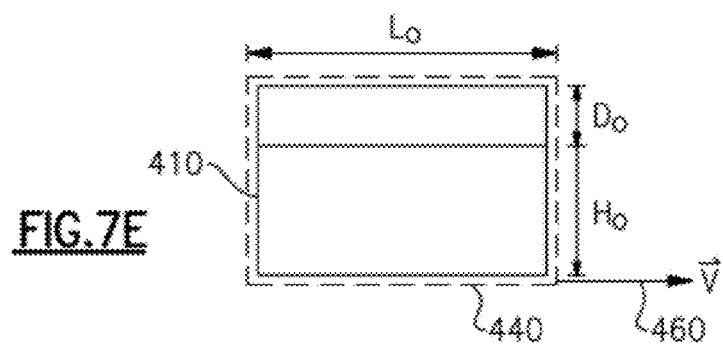
FIG. 7E is a schematic diagram corresponding to another example of a special case of the depth dimensioning process of FIG. 4.

FIG. 7C illustrates another special case example in which no "side" of the vehicle is visible. This example corresponds to a viewing azimuth angle of either zero degrees or 180 degrees. In this example, Equation (2) is reduced to a trivial form because cos(0 or 180)=1 and sin(0 or 180)=0 and the depth (width) Do of the object box 410 is the same as the length (width) of the bounding box 440. This example can be further simplified for the special case in which no "side" and no "top" of the vehicle are visible (i.e. a "front only" or "back only" view in which the viewing elevation angle is zero degrees and the viewing azimuth angle is 0 or 180 degrees), illustrated in FIG. 7D. In this example, both Equations (2) and (3) are reduced to a trivial form because cos(0)=1 and sin(0) =0, and the depth Do and height Ho of the object box 410 are equal to the length Lv and height Hv of the bounding box 440, respectively, as shown in FIG. 7D. Another special case example is illustrated in FIG. 7E in which no "front" of the vehicle is visible. This example corresponds to a viewing azimuth angle of ±90 degrees. In this example, Equation (2) is reduced to a trivial form because cos(90)=0 and sin(90)=1. These various special case examples illustrate the depth dimensioning process 600 for simplified cases and validate the process.

After the vehicle-center position location 450 (latitude and longitude) has been determined, the BSM generator 240 of the roadside module 130 can generate the BSM for the detected vehicle/object. In one example, the BSM generator 240 includes in the generated BSM an indication that the BSM originates from a stand-off sensor, rather than from an equipped vehicle 110. The BSM is then broadcast by the roadside module 130 using the antenna 250, as illustrated in FIG. 8 (broadcast represented by 810), so that it can be detected by equipped vehicles 110. In one embodiment, the broadcast is over wireless communication media using a Dedicated Short Range Communication (DSRC) standard, such as the 5.9 GHz DSRC for Wireless Access in Vehicular Environments (WAVE), for example.

According to one embodiment, the roadside module 130 also "listens" for organic (vehicle-generated) BSM data over wireless communication media, such as, for example, the DSRC at 5.9 GHz. The roadside module 130 is configured to determine whether any of the sensor-detected vehicles are equipped vehicles already generating their own BSM data, and to resolve which organic BSM data, if any, originates from a sensor-detected vehicle. Thus, the system can eliminate duplicate BSM data so as not to broadcast BSM data corresponding to equipped vehicles that are already generating organic BSM data. For example, if there are ten vehicles at an intersection and three of those are equipped vehicles 110 generating organic BSM data, each of the three equipped vehicles 110 will already be receiving two BSMs from the other equipped vehicles. Accordingly, there is no need for the roadside infrastructure to duplicate BSM data for these vehicles. Thus, if the system detects the ten vehicles at the intersection, the system resolves which of the ten detected vehicles are the equipped vehicles 110, and does not generate a duplicate BSM for those vehicles. The roadside module 130 does generate a new BSM for each detected unequipped vehicle 120, and broadcasts this BSM data for detection by the equipped vehicles 110. Thus, an infrastructure BSM generating system may proactively intervene for unequipped vehicles/objects and generate accurate, timely BSM data on their behalf. The supplemental BSM data generated by the infrastructure improves the effective BSM fleet penetration level for BSM-based safety applications, resulting in improved safety for both equipped vehicles 110 and unequipped vehicles 120 (which are emulated by the infrastructure-generated BSM).

Figure 9:
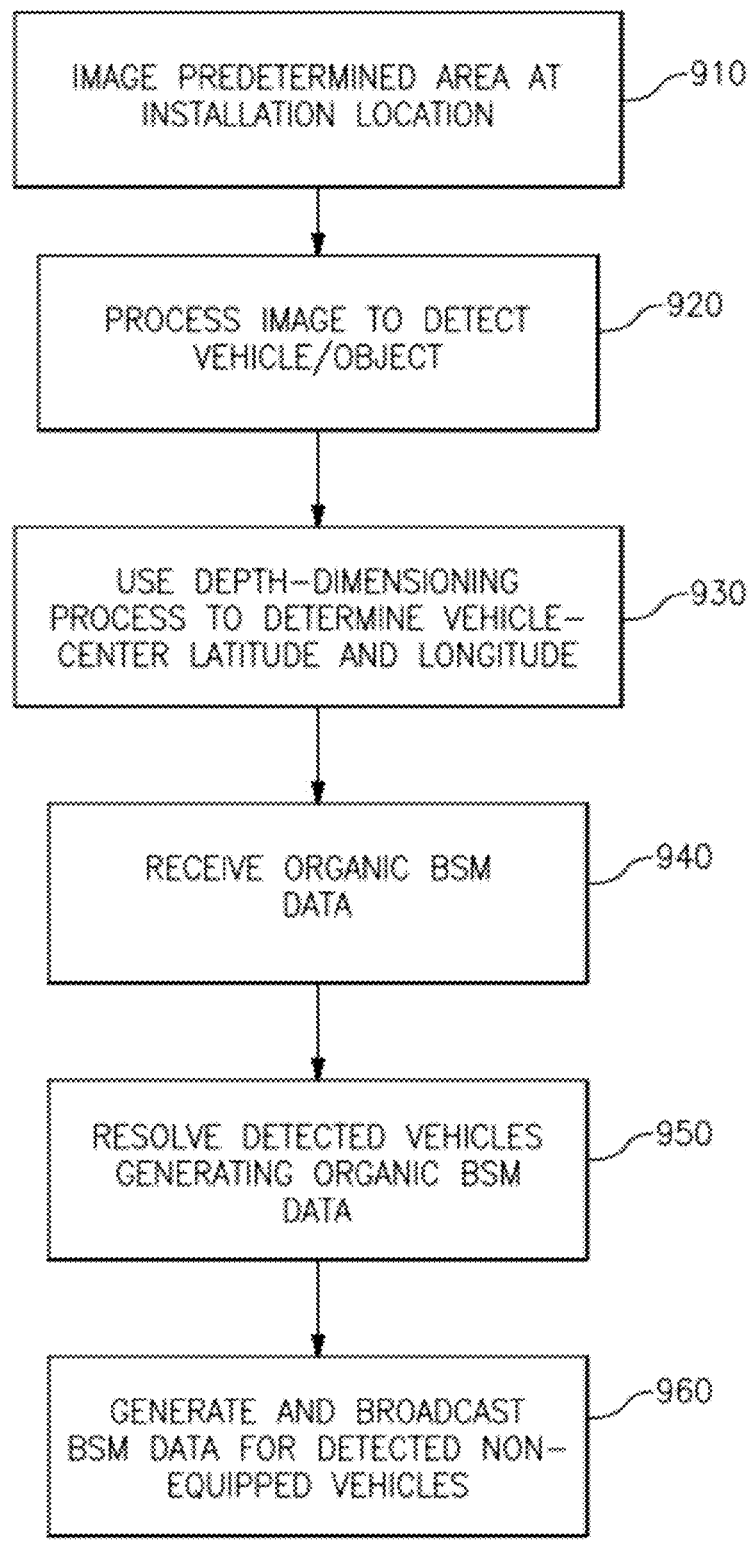
FIG. 9 is a flow diagram illustrating one example of a method of generating basic safety message data according to aspects of the invention.

In summary, referring to FIG. 9, there is illustrated an example of an infrastructure BSM generation method according to one embodiment. As discussed above, the system is configured to image a predetermined area (step 910) using the camera 210 and perform image processing on the image to detect vehicle(s) and/or object(s) within the imaged area (step 920). These steps may be repeated periodically to provide continually updating data of objects within the predetermined area. For systems using the J2735 BSM specification, the system may optionally implement a depth dimensioning process, as discussed above, to translate the image-based detection location into the vehicle-center location (in latitude and longitude), in accord with the specification (step 930). The system receives live BSM data from equipped vehicles at or near the installation location (step 940) via the antenna 250 and the compares the received BSM data against the set of all detected vehicles to determine which detected vehicles are already generating organic BSM data (step 950). The system then generates BSM data for all the unequipped vehicles detected and the system broadcasts this BSM data for reception by the equipped vehicles (step 960). Steps 920-950 may be performed by associated functional elements, including the video analytics 220, BSM generator 240 and processor 260 any of which may perform some or all of these steps and, as discussed above, may be implemented separately or together as one or more hardware and/or software elements/components.

Thus, a system and method according to aspects and embodiments of the present invention generates valid, accurate BSM data from stand-off (non-vehicle) sensors, which may be used to supplement and improve the effectiveness of BSM-based safety applications. Having described above several aspects of at least one embodiment, it is to be appreciated various alterations, modifications, and improvements will readily occur to those skilled in the art. For example, although several examples discussed above refer to vehicle detection, embodiments of the infrastructure system may also be used to detect and generate BSM for objects other than vehicles. Similarly, although the J2735 BSM specification is one example of a message protocol that can be used, embodiments of the system may be configured to generate message data compliant with other specifications or protocols. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A roadside infrastructure system for generating basic safety message (BMS) data, the system including a roadside module comprising:
    a camera configured to provide an image of a predetermined fixed area;
    video analytics coupled to the camera and configured to process the image to detect objects within the image, the video analytics being further configured to output a position of a detected object;
    a BSM generator coupled to the video analytics and configured to receive the position of the detected object and to generate a BSM comprising the position of the object and an indicator identifying the BSM as having been generated by the roadside module; and
    an antenna coupled to the BSM generator and configured to receive the BSM from the BSM generator and to broadcast the BSM.

2. The system as claimed in claim 1, wherein the video analytics is configured to output the position of the detected object as a latitude and longitude of the detected object.

3. The system as claimed in claim 2, wherein the video analytics is configured to register the image to a known latitude and longitude grid based on a known location or registration of the camera to determine the latitude and longitude of the detected object.

4. The system as claimed in claim 1, wherein the video analytics is configured to output an image-based position of the detected object, and further comprising:
    a processor coupled to the video analytics and to the BSM generator, and configured to receive the image-based position of the detected object and to determine an object-center position of the detected object; and wherein the BSM generator is configured to generate the BSM comprising the object-center position of the detected object.

5. The system as claimed in claim 1, further comprising a processor coupled to the antenna and to the BSM generator;
   wherein the antenna is further configured to receive BSM data from BSM-generating objects; and
   wherein the processor is configured to determine whether the detected object corresponds to a BSM-generating object, and to control the BSM generator to generate the BSM only for non-BSM-generating detected objects.

6. The system as claimed in claim 1, further comprising a sensor coupled to the video analytics.

7. The system as claimed in claim 6, wherein the sensor includes at least one of an infrared sensor, a radar, a sonar, and a thermal imaging sensor.

8. The system as claimed in claim 1, wherein the detected object is a vehicle.

9. A method of generating basic safety message (BSM) data from stand-off sensors, the method comprising:
   obtaining an image of a predetermined fixed area;
   processing the image to detect an object within the image;
   determining a position of the detected object;
   receiving vehicle-generated BSM data;
   determining whether the vehicle-generated BSM data originates from the detected object;
   generating a BSM comprising the position of the detected object only if the vehicle-generated BSM data does not originate from the detected object; and
   broadcasting the BSM.

10. The method as claimed in claim 9, wherein determining the position of the detected object includes:
    determining an image-based position of the detected object; and
    converting the image-based position to an object-center position of the detected object.

11. The method as claimed in claim 10, wherein the image-based position corresponds to a lower center position on a bounding box surrounding the detected object in the image, and wherein converting the image-based position to the object-center position includes:
    determining a three-dimensional object box corresponding to the detected object in the image;
    performing geometric calculations to determine a calculated length, height and depth of the three-dimensional object box;
    comparing the length, height and depth to known ratios of length to height to depth corresponding to common objects to confirm that the calculated length, height and depth of the three-dimensional object box are within predetermined tolerances; and
    determining the object-center position from the image-based position.

12. The method as claimed in claim 11, wherein determining the object-center position of the detected object includes determining a latitude and longitude of the detected object.

13. The method as claimed in claim 9, further comprising:
    detecting multiple objects;
    resolving which detected objects are generating the vehicle-generated BSM data; and
    generating the BSM only for those detected objects which are not generating the vehicle-generated BSM data.

14. The method as claimed in claim 9, wherein broadcasting the BSM includes broadcasting the BSM using a dedicated short range communication standard.

15. The method as claimed in claim 9, determining the position of the detected object includes registering the image to a known latitude and longitude grid to determine a latitude and longitude of the detected object.

16. The method as claimed in claim 9, wherein obtaining the image includes obtaining the image using at least one of a camera, radar, sonar, and a thermal imaging sensor.

17. A roadside infrastructure system for generating basic safety message (BMS) data, the system including a roadside module comprising:
    a camera configured to provide an image of a predetermined fixed area;
    video analytics coupled to the camera and configured to process the image to detect objects within the image, the video analytics being further configured to output a position of a detected object;
    a BSM generator coupled to the video analytics and configured to receive the position of the detected object and to generate a BSM comprising the position of the object;
    an antenna coupled to the BSM generator and configured to receive the BSM from the BSM generator, to receive BSM data from BSM-generating objects, and to broadcast the BSM; and
    a processor coupled to the antenna and to the BSM generator, the processor configured to determine whether the detected object corresponds to a BSM-generating object and to control the BSM generator to generate the BSM only for non-BSM-generating detected objects.

* * * * *